US009813568B2

United States Patent
Fujii et al.

(10) Patent No.: US 9,813,568 B2
(45) Date of Patent: Nov. 7, 2017

(54) IMAGE PROCESSING APPARATUS AND NON-TRANSITORY COMPUTER READABLE MEDIUM FOR MORE UNIFORMLY DISTRIBUTING DOCUMENTS

(71) Applicant: FUJI XEROX CO., LTD., Tokyo (JP)

(72) Inventors: Masaru Fujii, Kanagawa (JP); Kentaro Osajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/991,367

(22) Filed: Jan. 8, 2016

(65) Prior Publication Data

US 2017/0094080 A1 Mar. 30, 2017

(30) Foreign Application Priority Data

Sep. 24, 2015 (JP) .................... 2015-186286
Sep. 24, 2015 (JP) .................... 2015-186672

(51) Int. Cl.
*G06F 3/12* (2006.01)
*H04N 1/00* (2006.01)
*H04N 1/23* (2006.01)

(52) U.S. Cl.
CPC ..... *H04N 1/00347* (2013.01); *H04N 1/00708* (2013.01); *H04N 1/2361* (2013.01); *H04N 2201/0039* (2013.01); *H04N 2201/0094* (2013.01)

(58) Field of Classification Search
CPC ........... H04N 1/33369; H04N 1/32374; H04N 1/32384; H04N 1/411; H04N 1/32416; H04N 1/32101; H04N 1/00127; H04N 1/00175; H04N 1/00193; H04N 1/00766; H04N 1/32443; H04N 1/32352; H04N 1/005; G06K 15/1828; G06F 11/00; G06F 3/1271
See application file for complete search history.

(56) References Cited

U.S. PATENT DOCUMENTS

| 5,630,583 | A | 5/1997 | Yergenson |
| 6,760,765 | B1 | 7/2004 | Asai et al. |
| 2008/0239374 | A1* | 10/2008 | Yamaguchi .......... H04N 1/2179 358/1.15 |

(Continued)

FOREIGN PATENT DOCUMENTS

| JP | 9-175671 A | 7/1997 |
| JP | 11-27648 A | 1/1999 |

(Continued)

*Primary Examiner* — Henok A Shiferaw
(74) *Attorney, Agent, or Firm* — Sughrue Mion, PLLC

(57) ABSTRACT

An image processing apparatus includes: a providing unit that provides a document data accumulated in a host apparatus according to a request from another apparatus in a same apparatus group to which the host apparatus belongs; and a control unit that acquires information of a size of document group accumulated in each of other image processing apparatuses from each of those image processing apparatuses in the apparatus group, and performs control of moving the document among the host apparatus and those image processing apparatuses in such a manner that the size of the document group accumulated in the host apparatus and each of those image processing apparatuses approaches uniform.

8 Claims, 12 Drawing Sheets

(56) References Cited

U.S. PATENT DOCUMENTS

| | | | |
|---|---|---|---|
| 2010/0238500 A1* | 9/2010 | Teramoto | H04L 12/1822 358/1.15 |
| 2012/0054248 A1* | 3/2012 | Mehrotra | G06F 17/30557 707/803 |
| 2012/0137087 A1* | 5/2012 | Umimura | H04N 1/2183 711/154 |
| 2013/0100488 A1 | 4/2013 | Maezawa et al. | |
| 2014/0320924 A1 | 10/2014 | Maezawa et al. | |

FOREIGN PATENT DOCUMENTS

| JP | 2000-304433 A | 11/2000 |
|---|---|---|
| JP | 2001-202330 A | 7/2001 |
| JP | 2009-75832 A | 4/2009 |
| JP | 2013-92890 A | 5/2013 |

\* cited by examiner

FIG. 4

< APPARATUS A >

| DOCUMENT ID | USER ID | SIZE [MB] | REMAINING STORAGE PERIOD [hours] |
|---|---|---|---|
| 100001 | α | 1 | 1 |
| 100002 | α | 1 | 1 |
| 100003 | α | 1 | 1 |
| 100004 | α | 1 | 2 |
| 100005 | β | 1 | 1 |
| 100006 | β | 1 | 1 |
| 100007 | β | 1 | 2 |

< APPARATUS B >

| DOCUMENT ID | USER ID | SIZE [MB] | REMAINING STORAGE PERIOD [hours] |
|---|---|---|---|
| 200001 | α | 1 | 1 |

< APPARATUS C >

| DOCUMENT ID | USER ID | SIZE [MB] | REMAINING STORAGE PERIOD [hours] |
|---|---|---|---|
| 300001 | γ | 1 | 2 |

FIG. 10

| APPARATUS ID | BELONGING GROUP ID |
|---|---|
| localhost | 01 |
| 172.27.67.67 | 01 |
| 172.27.67.46 | 02 |
| 172.27.67.39 | 02 |
| 172.27.67.39 | 04 |
| 172.27.67.12 | 10 |

FIG. 11

| APPARATUS ID | BELONGING GROUP ID |
|---|---|
| user01 | 01 |
| user02 | 02 |
| user03 | 01 |
| ... | ... |
| userN | 05 |

IMAGE PROCESSING APPARATUS AND NON-TRANSITORY COMPUTER READABLE MEDIUM FOR MORE UNIFORMLY DISTRIBUTING DOCUMENTS

CROSS-REFERENCE TO RELATED APPLICATIONS

This application is based on and claims priority under 35 USC 119 from Japanese Patent Application No. 2015-186286 filed on Sep. 24, 2015 and Japanese Patent Application No. 2015-186672 filed on Sep. 24, 2015.

BACKGROUND

Technical Field

The present invention relates to an image processing apparatus and a non-transitory computer readable medium.

SUMMARY

An aspect of the present invention provides an image processing apparatus including: a providing unit that provides a document data accumulated in a host apparatus according to a request from another apparatus in a same apparatus group to which the host apparatus belongs; and a control unit that acquires information of a size of document group accumulated in each of other image processing apparatuses from each of those image processing apparatuses in the apparatus group, and performs control of moving the document among the host apparatus and those image processing apparatuses in such a manner that the size of the document group accumulated in the host apparatus and each of those image processing apparatuses approaches uniform.

BRIEF DESCRIPTION OF THE DRAWINGS

Exemplary embodiment(s) of the present invention will be described in detail based on the following figures, wherein

FIG. 4 is a diagram illustrating an example of document management information;

FIG. 10 is a diagram illustrating an example of group information;

FIG. 11 is a diagram illustrating an example of user belonging information;

DETAILED DESCRIPTION

Hereinafter, exemplary embodiments of the present invention will be described with reference to the drawings.

First Embodiment

Figure 1:
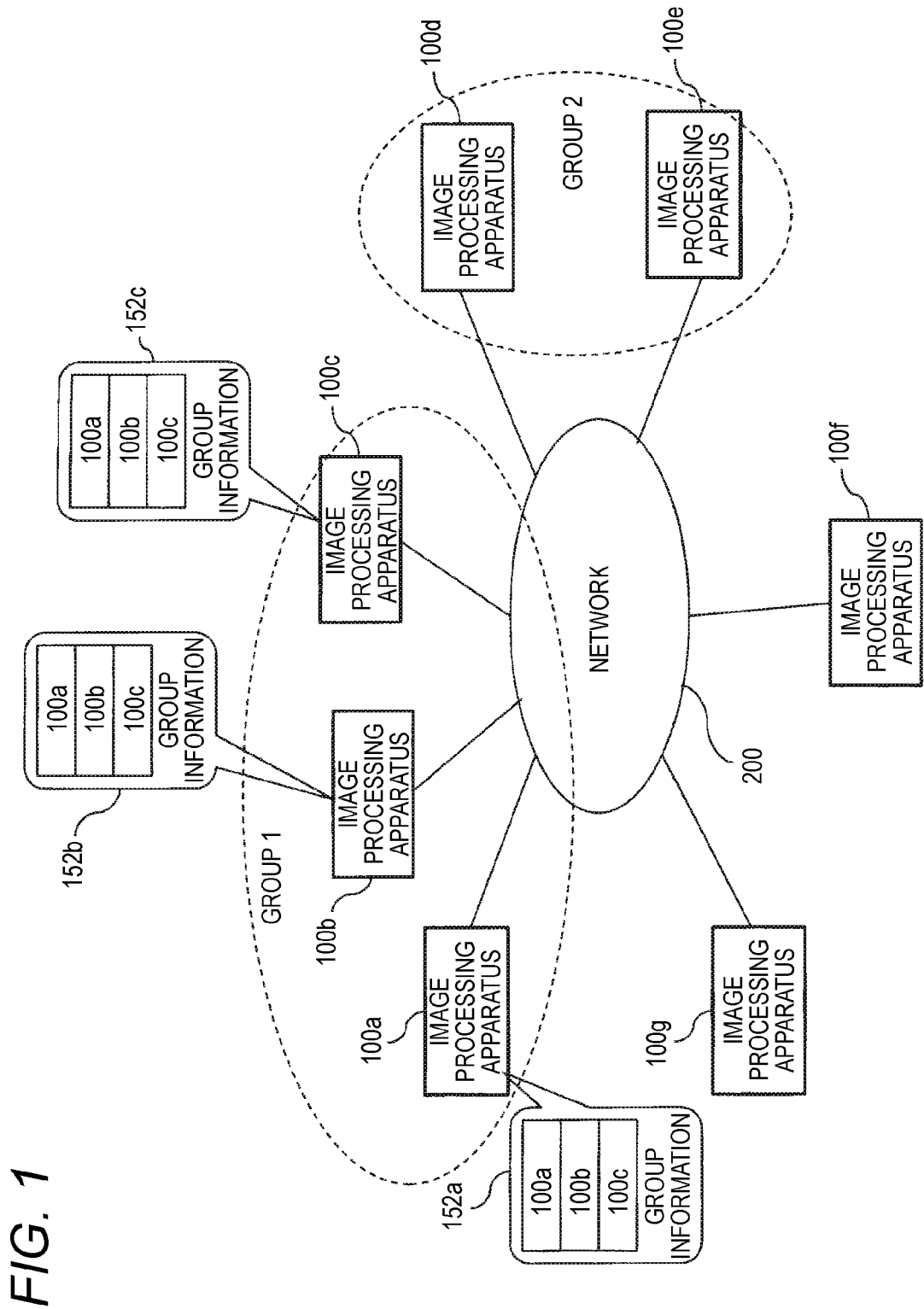
FIG. 1 is a diagram for describing a system in which a plurality of image processing apparatuses forms a group.

As illustrated in FIG. 1, image processing apparatuses 100a to 100g (hereinafter, collectively referred to as image processing apparatus 100 in a case where there is no need to distinguish the apparatuses from each other) in the present embodiment are capable of communicating with each other via a network 200 for data communication such as the local area network (LAN). A communication address (for example, an IP address) is allocated to each image processing apparatus 100 for communication in the network 200.

The image processing apparatus 100 is an apparatus that has a function of printing document data (hereinafter, also referred to as a "document"), and a digital printer and a digital multifunction machine (an apparatus having functions of a printer, a scanner, a copying machine, a facsimile, and the like) are examples of the apparatus. The image processing apparatus 100 receives the document data from client devices (not illustrated) such as a personal computer and a mobile terminal (for example, a smart phone) via the network 200. In addition, the image processing apparatus 100 may have a function of receiving the document data through a proximity wireless communication such as a near field communication (NFC) or Bluetooth® from a mobile terminal the user has.

The illustrated image processing apparatus 100 can form a group with other image processing apparatuses 100, and a document (document data) input and accumulated in any of the image processing apparatuses 100 in the group can be printed out from any image processing apparatus 100 in the same group. This mechanism is a serverless (a server is not used) mechanism which is realized by cooperative operations by those image processing apparatuses 100. That is, in this mechanism, a server such as one printer server that centrally manages the input document (document data) is not used. As described above, a function of printing the documents accumulated in the image processing apparatus 100 in the group by any of the image processing apparatuses 100 in the group is referred to as a "group printing function" hereafter. In addition, the group of the image processing apparatuses 100 will be referred to as a "serverless group" or simply referred to as a "group".

Each of the image processing apparatuses 100a to 100g stores group information items 152a to 152g that represent the groups to which the apparatuses belong respectively. The group information items 152a to 152g (only 152a to 152c are illustrated in FIG. 1) (hereinafter, collectively referred to as group information 152 in a case where there is no need to distinguish the groups from each other) include a list of the communication addresses of the image processing apparatuses 100 included in the group to which each apparatus belongs. In the example in FIG. 1, the image processing apparatuses 100a, 100b, and 100c form one group ("group 1"), and respectively hold the group information items 152a to 152c that include the communication addresses of those three apparatuses.

When focusing on one image processing apparatus 100, the group information 152 of the image processing apparatus 100 represents the communication address of the image processing apparatus 100 that is the linking destination to which the image processing apparatus 100 is linked in the point of the group printing function.

To illustrate a specifically used scene, the entire system in FIG. 1 is a system formed from a plurality of groups of the image processing apparatuses 100, for example, in a certain company, and an example can be considered, in which the plurality of image processing apparatuses 100 is divided into a certain number of groups according to the way of the operation of the system.

Figure 2:
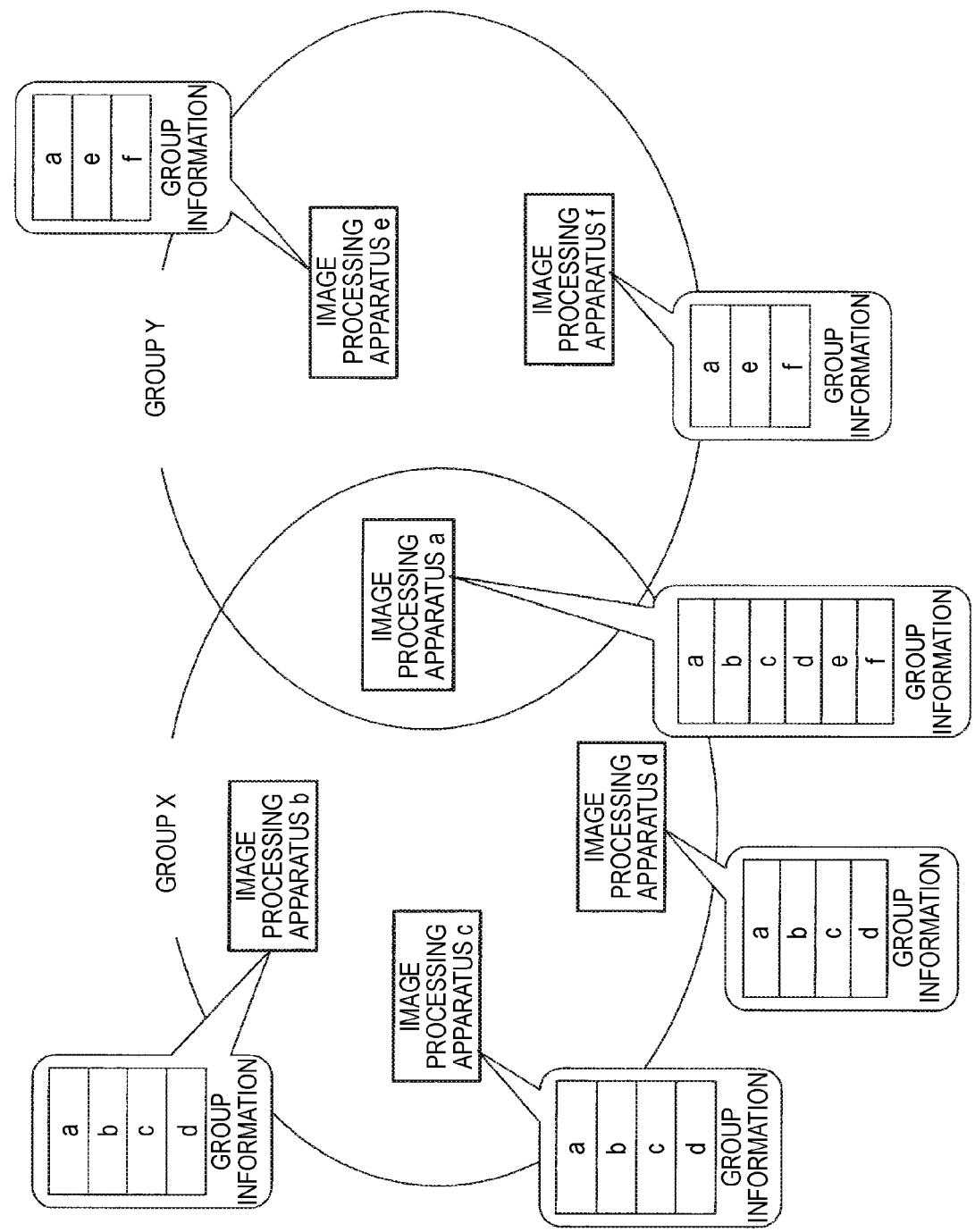
FIG. 2 is a diagram illustrating an example in which one image processing apparatus belongs to the plurality of groups.

In addition, an image processing apparatus 100 can belong to a plurality of groups. In an example in FIG. 2, an image processing apparatus a belongs to both a group X and a group Y. Not only the document accumulated in the image processing apparatus a itself but also the documents accumulated in the image processing apparatuses b, c, and d which belong to group X and the documents accumulated in the image processing apparatuses e and f that belong to group Y can be printed out from the image processing apparatus a.

Figure 3:
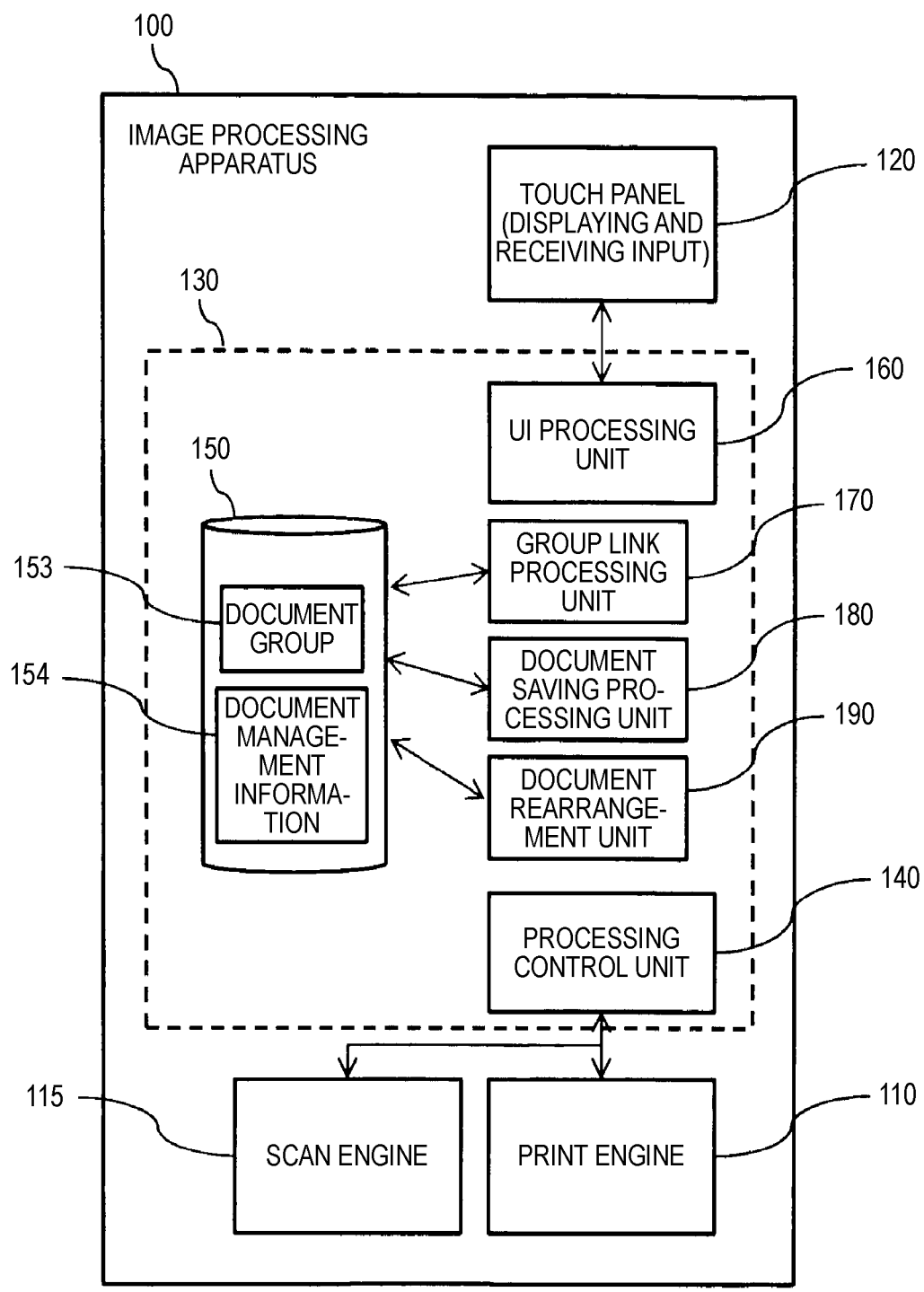
FIG. 3 is a diagram illustrating an example of a functional configuration of an individual image processing apparatus.

An example of an internal configuration of the individual image processing apparatus 100 is illustrated in FIG. 3.

A print engine 110 in the image processing apparatus 100 illustrated in FIG. 3 is a mechanism for forming (printing) an image on a medium such as a sheet. In addition, a scan engine 115 is a mechanism for optically reading the image on the sheet and for generating image data representing the read image. In FIG. 3, an apparatus 100 having functions of printing, scanning, and copying is exemplified, but it is just an example. Other than this, the image processing apparatus 100 may have, for example, a function of facsimile transmission or may be a single function apparatus having a function of printing only.

A touch panel 120 is a device for a local user interface (UI) with the image processing apparatus 100, and displays a UI screen or receives an input from a user by a touching operation with respect to the UI screen. The image processing apparatus 100 may include a display device and an input device having mechanical buttons or ten-keys as a device for local UI interface instead of or in addition to the touch panel.

An information processing unit 130 is a mechanism for executing various information processing tasks for controlling of the image processing apparatus 100. The information processing unit 130 includes a processing control unit 140, a storage unit 150, a UI processing unit 160, a group link processing unit 170, a document saving processing unit 180, and a document rearrangement unit 190.

The processing control unit 140 controls the print engine 110 and the scan engine 115, and then, executes processing tasks instructed by the user. For example, the processing control unit 140 converts document data received from a personal computer of the user via the network 200 to image data that can be received by the print engine 110, and supplies the image data to the print engine 110 to be printed. In addition, the processing control unit 140 controls the scan engine 115 to read an image of a script and stores the read-resulting image data in a local storage region, or transmits the image data to the personal computer or the like in the network. In addition, the processing control unit 140 executes copying processing by causing the image read by the scan engine 115 to be printed on the print engine 110.

In addition, the processing control unit 140 has a function of storing (accumulating) the document (document data) received from the user via the network 200 in a storage device (not illustrated) in the image processing apparatus 100 in association with identification information (referred to as "user ID") of the user. The user ID of the user who input the document data may be acquired by the image processing apparatus 100 performing user authentication when the user requests the image processing apparatus 100 to accumulate the document data.

The storage unit 150 stores a document group 153 received from the user and document management information 154 used for managing a rearrangement of the document group 153.

The document management information 154 is illustrated in FIG. 4. In FIG. 4, document management information items 154 of three image processing apparatuses 100 of an apparatus A, an apparatus B, and an apparatus C are illustrated. A document ID that is identification information of the document, a user ID that is identification information of the user accumulating the document in the image processing apparatus 100, a data size (in a unit of megabytes in the illustration) of the document, and a remaining storage period (in a unit of hours in the illustration) of the document are included in the document management information 154 for each document. For example, the example in FIG. 4 illustrates that a user ID of a record of document ID "100001" accumulated in apparatus A is "α", a document size is 1 MB, and a remaining storage period is one hour.

The remaining storage period is a length of the remaining period during which the document is stored in the group to which the image processing apparatus 100 of the accumulation destination belongs. When the document is accumulated in the image processing apparatus 100, a preset storage period value is set as the remaining storage period of the document, and the remaining storage period is updated (that is, decreased) with an elapse of time thereafter. The document accumulated in the image processing apparatus 100 is removed when the document is printed out according to the printing instruction from the image processing apparatus 100 (including the host apparatus) in the same group. However, even in a case where there is no printing instruction, the document is stored in any of the image processing apparatuses 100 in the group during at least the remaining storage period seen from the current time. In other words, in a case where the storage period time has elapsed without the printing instruction from the user after the accumulation, the document in such a case is removed from the image processing apparatus 100.

The UI processing unit 160 performs user interface processing of the image processing apparatus 100. For example, the UI processing unit 160 displays UI screens such as a menu screen or a setting screen on the touch panel 120, and acquires the user's input to such UI screens.

The group link processing unit 170 executes the processing for the group printing function described above.

For example, the group link processing unit 170 collects a list of documents registered by the user from the image processing apparatus 100 or another image processing apparatus 100 on the network 200 linked to the above apparatus (that is, in the same group) according to an instruction from an (authenticated) user operating the local UI (touch panel 120 and the like) of the image processing apparatus 100, and generates a printing target selection screen by combining the collected list. At the time of this collection, the group link processing unit 170 transmits a request for a document list that includes the user ID of the user who is the instruction source as a parameter to a communication address of the other image processing apparatus 100 in the group information as a destination. Then, the group link processing unit 170 acquires the document list returned from the addressed image processing apparatus 100 in response to the request. The UI processing unit 160 generates the printing target selection screen that includes the document list, and displays the list on the touch panel 120. The user selects the document currently desired to be printed from the printing target selection screen. The result of this selection is transferred to the group link processing unit 170 via the UI processing unit 160. The group link processing unit 170 requests for the selected document to the image processing apparatus 100 in which the document is accumulated, and then, transfers the document acquired in response to the request to the processing control unit 140, and instructs to print the document.

In addition, when receiving a request for a document list including the user ID from another image processing apparatus 100, the group link processing unit 170 generates a document list corresponding to the user ID accumulated in the image processing apparatus 100 itself, and returns the generated list to the image processing apparatus 100 of the request source. In addition, when a request for a document in the list is received from the image processing apparatus 100 which is the providing source of the list, the group link processing unit 170 transmits the document to the image processing apparatus 100.

In a case where an instruction of a state in which other image processing apparatuses 100 cannot access the image processing apparatuses 100 for a long period equal to or longer than a certain threshold value (hereinafter, referred to as "inaccessible state") such as a shut-down is received, the document saving processing unit 180 performs processing of saving the document group 153 accumulated in the storage device in the host apparatus to other image processing apparatuses 100 in the same group. When the image processing apparatus 100 is in the inaccessible state, it becomes impossible to output the documents accumulated in the image processing apparatus 100 from other linked image processing apparatuses 100. In order to positively avoid this situation, in the present embodiment, the document group 153 accumulated in the image processing apparatus 100 savings in other image processing apparatuses 100 at the time of transition to the inaccessible state. The saving of the document is performed, for example, by moving a document file itself to the image processing apparatus 100 that will access the file. In this case, the document is removed from the image processing apparatus 100 that transits to the inaccessible state. In addition, the saving of the document may be performed by copying the document into the image processing apparatus 100 that will access the document.

The document rearrangement unit 190 performs processing for rearrangement of the documents between those image processing apparatuses 100 in order for uniformity of an amount of documents accumulated in each of the image processing apparatuses 100 in the group. The rearrangement of the documents is performed by moving the documents accumulated in a certain image processing apparatus 100 in a group to other image processing apparatuses 100 (hereinafter, referred to as "linked apparatus") in the same group. The processing by the document rearrangement unit 190 will be described below in detail.

As above, the configuration of the image processing apparatus 100 is described. Next, processing performed by the document rearrangement unit 190 will be described with reference to FIG. 5.

In this procedure, in a case where it is detected that a new document is accumulated in the storage unit 150 (the determination result in S100 is YES), the document rearrangement unit 190 proceeds to processing subsequent to S102. In this example, the sizes of the documents accumulated in the storage unit 150 are summed and it is determined whether or not the total size is greater than a threshold value set in advance (S102). In a case where the total size is not greater than the threshold value, the process ends. That is, in the example in FIG. 5, the uniformity of the amount of the documents in each of the image processing apparatuses 100 in the group is attempted by transferring the documents accumulated in the host apparatus to the linked apparatus. However, in a case where the amount of document group 153 accumulated in the host apparatus is large (that is, less than the threshold value), even though the documents in the host apparatus are transferred to the linked apparatus, the effect of uniformity commensurate with the processing load cannot be obtained. Then, in this example, in a case where the result of determination in S102 is NO, the processing ends.

In the determination in S102, in a case where it is determined that the total size is equal to or greater than the threshold value, the process proceeds to S104. Then, the image processing apparatus 100 performs communication with each of the other image processing apparatuses 100 in the same group (that is, the linked apparatus). As a result of the communication, if there is no image processing apparatus 100 that can be communicated with, then the rearrangement of the document in the same group cannot be performed. Therefore, the process ends.

In S104, in a case where it is possible to communicate with one or more linked apparatuses, the document rearrangement unit 190 acquires the document management information (refer to FIG. 4) from those linked apparatuses that can be communicated with (S106). Next, an average value of the amount of the documents accumulated in the linked apparatuses that can be communicated with and the host apparatus per one apparatus is calculated (S108). That is, for example, the sum of the sizes of the accumulated documents is calculated for each of the linked apparatuses and the host apparatus from the acquired document management information in each of the linked apparatuses and the document management information 154 in the host apparatus. Then, the sizes of the accumulated documents in each of the apparatuses are summed, and then, the average value of the sizes of the accumulated documents per one apparatus is obtained by dividing the sum by the number of the apparatuses.

Next, the document rearrangement unit 190 calculates a difference between the sizes of the documents accumulated in the host apparatus and each of the linked apparatuses that can be communicated with and the average value calculated in S108 (S110). In addition, a dispersing or standard deviation of the sizes of the documents currently accumulated in the group of apparatuses may be obtained from the difference between the sizes and the average value.

Next, the document rearrangement unit 190 determines whether or not the variation of the sizes of the document group 153 accumulated in each of the apparatuses can be made small by transferring (moving) some of the documents in the host apparatus to any of the linked apparatus that can be communicated with (S112). That is, regarding various transfer patterns with regard to which document in the host apparatus will be transferred to which linked apparatus, the variation (for example, the dispersing or the standard deviation) of the document group 153 in each of the host apparatus and the linked apparatus is obtained, and then, the it is determined whether or not the transfer pattern is present, in which a variation becomes smaller than the current variation. In a case where such a transfer pattern is not present, the process ends. In S112, an allowable upper limit of the variation may be set in advance and the transfer pattern in which the variation is equal to or lower than the allowable upper limit may be extracted.

In S112, in a case where it is understood that the transfer pattern in which the variation of the sizes of the accumulated documents is lower than the current variation (or lower than the allowable upper limit) is present, the document rearrangement unit 190 determines whether or not the transfer pattern in which distributions of the remaining storage period further approaches uniform between the host apparatus and the linked apparatuses than that of the current transfer pattern is present in those transfer patterns (S114). Here, in a case where the length of the remaining storage period is divided into a couple of ranges such as a range of less than 30 minutes remaining or a range of 30 minutes to one hour remaining, the distribution of the total size of the documents for each of those ranges may be used as the distribution of the remaining storage period. In this case, in S114, the document rearrangement unit 190 searches for the transfer pattern in which the total size of the documents in the ranges further approaches uniform between the host apparatus and the linked apparatuses for each range of the remaining storage period of the accumulated documents. In a case where such the transfer pattern is not present, the process ends. In S114, an allowable upper limit may be set in advance in the variation of the distribution of the remaining storage period, and then, the transfer pattern in which the variation is lower than the allowable upper limit may be extracted. The allowable upper limit in this case, for example, may be determined in such a manner that a difference of the sizes of the documents belonging to each range of the distributions between the apparatuses becomes lower than an amount set in advance or becomes lower than a predetermined percentage of total size of the documents in the range within the group.

In a case where the result of the determination in S114 is YES, the document rearrangement unit 190 further determines whether or not the transfer pattern is present in the transfer patterns that satisfy both the conditions in S112 and S114, in which distributions of the users who accumulate the documents further approaches uniform than that of the current transfer pattern between the host apparatus and the linked apparatuses (S116). For example, the distribution of the total size of the documents accumulated by each user may be used as the distributions of the users who accumulate the documents. In this case, in S116, the document rearrangement unit 190 searches for the transfer pattern in which the total size of the documents accumulated by each user further approaches uniform than that of the current between the host apparatus and the linked apparatuses. In a case where such a transfer pattern is not present, the process ends. Also in S116, an allowable upper limit may be set in advance in the variation of the distribution of the user accumulating the documents, and then, the transfer pattern in which the variation is lower than the allowable upper limit may be extracted. In this case, the allowable upper limit may be determined in such a manner that a difference of the sizes of the documents accumulated for each user between the apparatuses becomes lower than an amount set in advance or becomes lower than a predetermined percentage of the total size of the documents in the range within the group.

In a case where the result of the determination in S116 is YES, the document rearrangement unit 190 selects one transfer pattern among the transfer patterns that satisfy the three conditions in S112, S114, and S116, and transfers the document in the storage unit 150 in the host apparatus to the corresponding linked apparatuses according to the transfer pattern (S118). In S118, for example, the transfer pattern may be selected, in which the document group 153 has the highest uniformity seen from three points of view of the total size of the accumulated documents, the distribution of the remaining storage period, and the distribution of the users.

The processing flow in FIG. 5 will be described with reference to specific examples in FIG. 6 and FIG. 7 (and FIG. 4).

Figure 6:
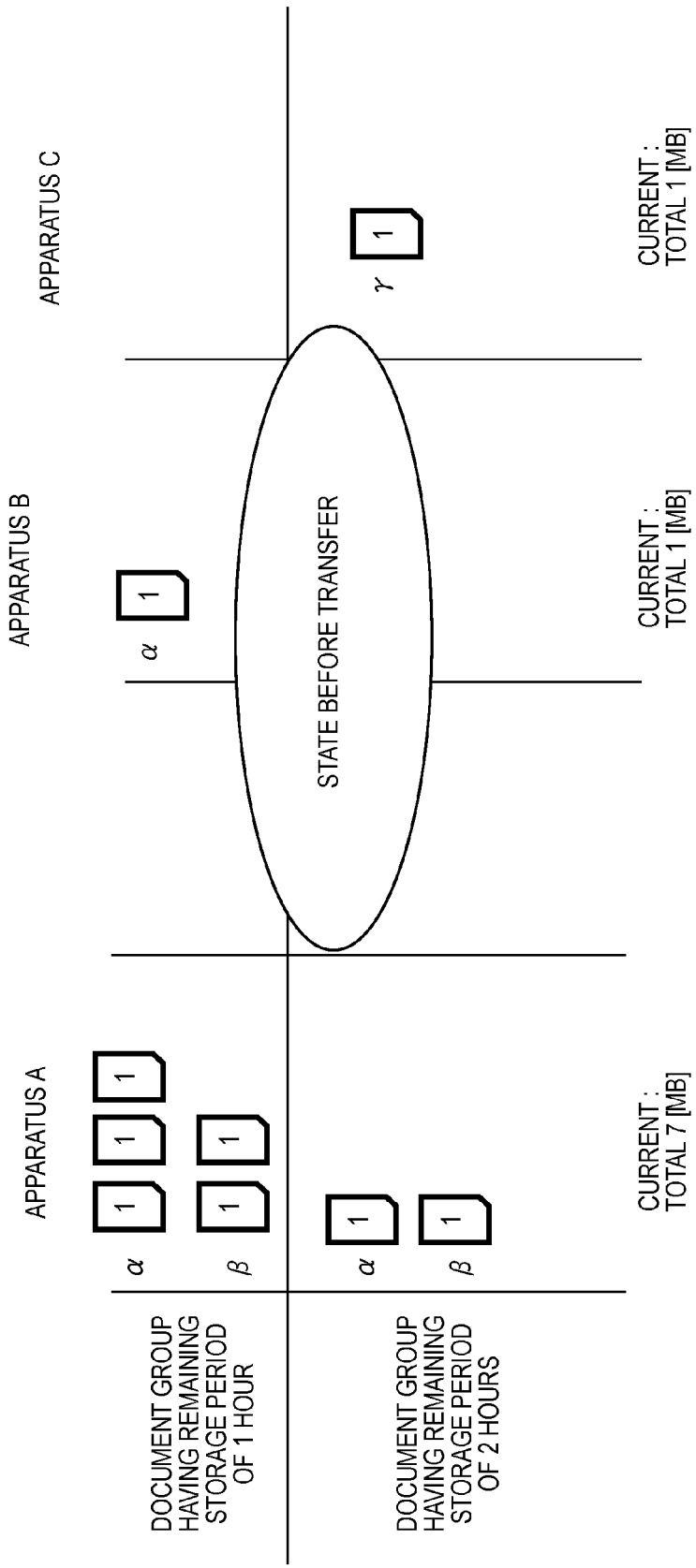
FIG. 6 is a diagram illustrating an example of a situation of accumulation of the documents in the group before a transmission by the document rearrangement unit.
Figure 7:
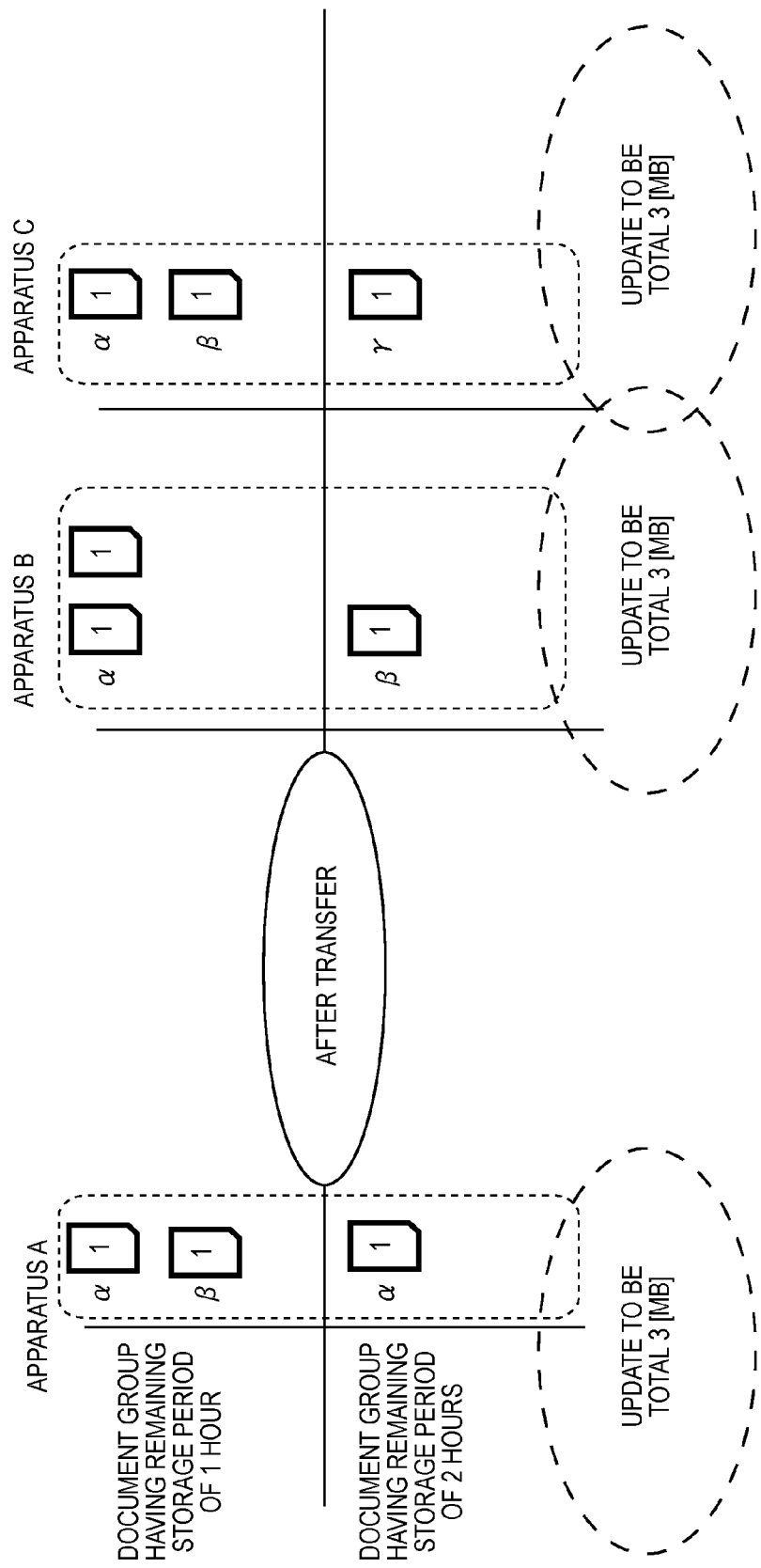
FIG. 7 is a diagram illustrating an example of a situation of accumulation of the documents in the group after the transmission by the document rearrangement unit.

FIG. 6 illustrates a current distribution of the accumulated document in the group form from three image processing apparatuses 100 of A to C. This distribution corresponds to the document management information items in each of the apparatuses A to C illustrated in FIG. 4. That is, in this example, a total of seven documents are currently accumulated in the apparatus A. The distribution in terms of the user shows four documents of a user α and three documents of a user β. The distribution in terms of the remaining storage period shows five documents having the remaining storage period of one hour and two documents having the remaining storage period of two hours. In addition, the size of the documents accumulated in the apparatus A is 7 MB. Similarly, only one document of the user a having the remaining storage period of one hour is accumulated in the apparatus B and the total size of the accumulated document is 1 MB. Only one document of the user y having the remaining storage period of two hours is accumulated in the apparatus C and the total size of the accumulated document is 1 MB.

For example, now, it is assumed that the situation in FIG. 6 is a result of an accumulation of a document having 1 MB from the user β to the apparatus A. In this case, the document rearrangement unit 190 of the apparatus A acquires the document management information from the apparatuses B and C respectively, and recognizes that the distribution of the accumulated documents in the group is as illustrated in FIG. 6. Then, the average size of the accumulated documents per one apparatus in this situation is calculated to be 3 MB. Then, as a transfer pattern that can make three apparatuses uniform in view of three points which are the total size of the documents, the distribution of the remaining storage periods, and the distribution of the users, a pattern can be obtained, in which the documents of the user a having the remaining storage period of one hour in the apparatus A are transferred to the apparatuses B and C by one document respectively, one document of the user β having the remaining storage period of one hour in the apparatus A is transferred to the apparatus C, and one document of the user β having the remaining storage period of two hours in the apparatus A is transferred to the apparatus B. The document rearrangement unit 190 of the apparatus A transfers the document in the storage unit 150 to the respectively corresponding linked apparatuses according this transfer pattern. FIG. 7 is illustrates a distribution of the accumulated documents in the group obtained as a result of the transfer. In the distribution in FIG. 7, the amount of accumulation of the documents for three apparatuses is 3 MB each and the distribution of the remaining storage period for three apparatuses also becomes uniform. The distribution of the users is not entirely the same between the three apparatuses and becomes more uniform than the distribution before the transfer illustrated in FIG. 6.

As above, the example of the processing by the document rearrangement unit 190 is described.

In the present embodiment, the uniformity of the amount of the documents accumulated in each of the image processing apparatuses 100 in the group is achieved by the processing of the document rearrangement unit 190. Therefore, even in a case where any of the image processing apparatuses 100 in the group is shifted to an inaccessible state, there is no big difference in the time required for the saving of the documents.

In addition, in the present embodiment, the uniformity in a viewpoint of the distribution of the remaining storage period can be achieved. Therefore, there is hardly a difference in the amount of the accumulated document size between the apparatuses with the elapse of time. That is, with the elapse of time, the accumulated documents may either be printed by the user or be automatically removed due to expiration of the storage period. However, if the distribution of the remaining storage period is made uniform between the apparatuses, the problem in that the variations in the amount of the accumulated document size between the apparatuses are increased due to the automatic removal, is less likely to occur.

In addition, in the present embodiment, the uniformity in the distribution of the users can be achieved. Therefore, for example, in a case where the user performs the processing of collecting (for example, printing) of the document group 153 of him/herself accumulated in the group into one image processing apparatus 100 in the group, shortening the time required for the collection can be expected. That is, the image processing apparatus 100 can acquire the document group 153 of the user from a plurality of linked apparatuses in parallel by performing the acquisition request to the plurality of linked apparatuses in a multi-socket manner. However, in a case of such a method, the time required for acquiring the document from the linked apparatus in which the amount of the document of the user is the largest becomes the time required for acquiring the entirety of documents of the user. Therefore, the collection time can become short when the documents of one user are accumulated as much as the same data size in each of the image processing apparatuses in the group, The processing procedure of the document rearrangement unit 190 illustrated in FIG. 5 is just an example. For example, in the procedure in FIG. 5, the processing starts with the accumulation of a new document in the host apparatus (S100) as a trigger. However, the processing subsequent to S102 may be performed with another event as a trigger. Removal of the document in the host apparatus and the starting of the host apparatus are examples of another trigger. In addition, the processing subsequent to S102 may be performed with the coming of a periodical timing as a trigger.

Figure 5:
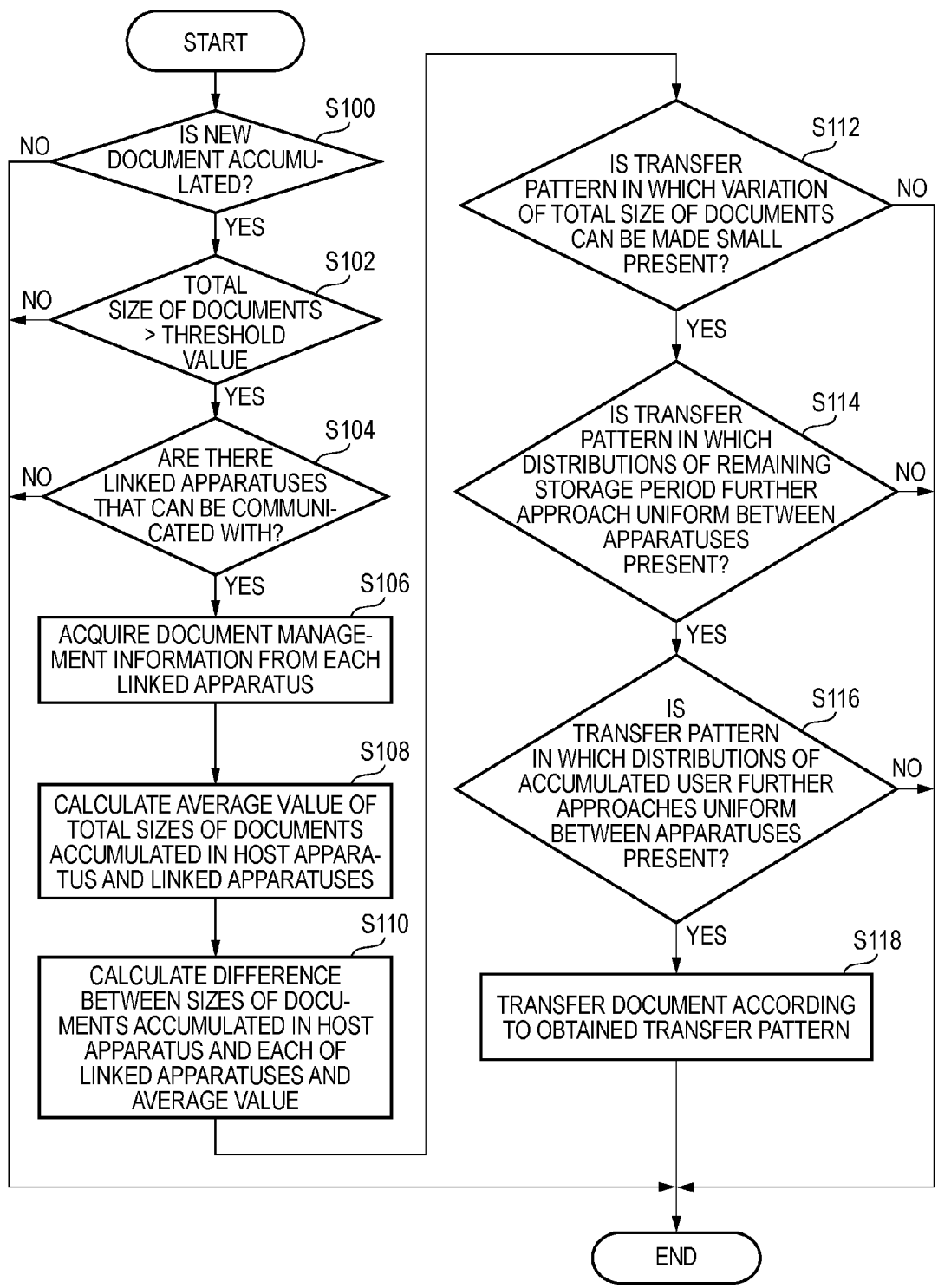
FIG. 5 is a diagram illustrating an example of a processing order in the document rearrangement unit.

In addition, in FIG. 5, the processing order is S112, S114, and S116 for the sake of convenience. However, the processing order in those three steps may not be the illustrated order.

Figure 8:
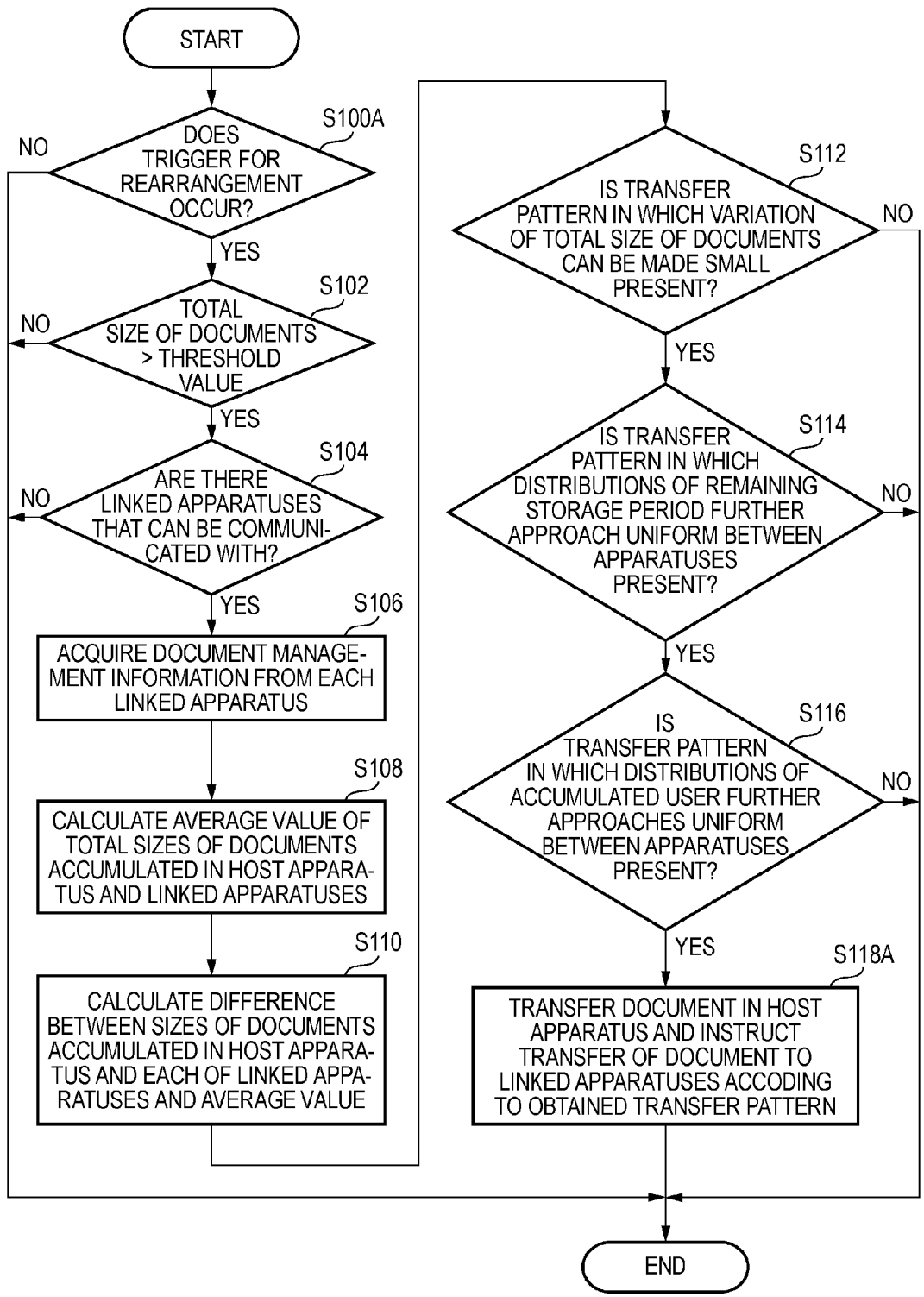
FIG. 8 is a diagram illustrating another example of a processing order in the document rearrangement unit.
Figure 9:
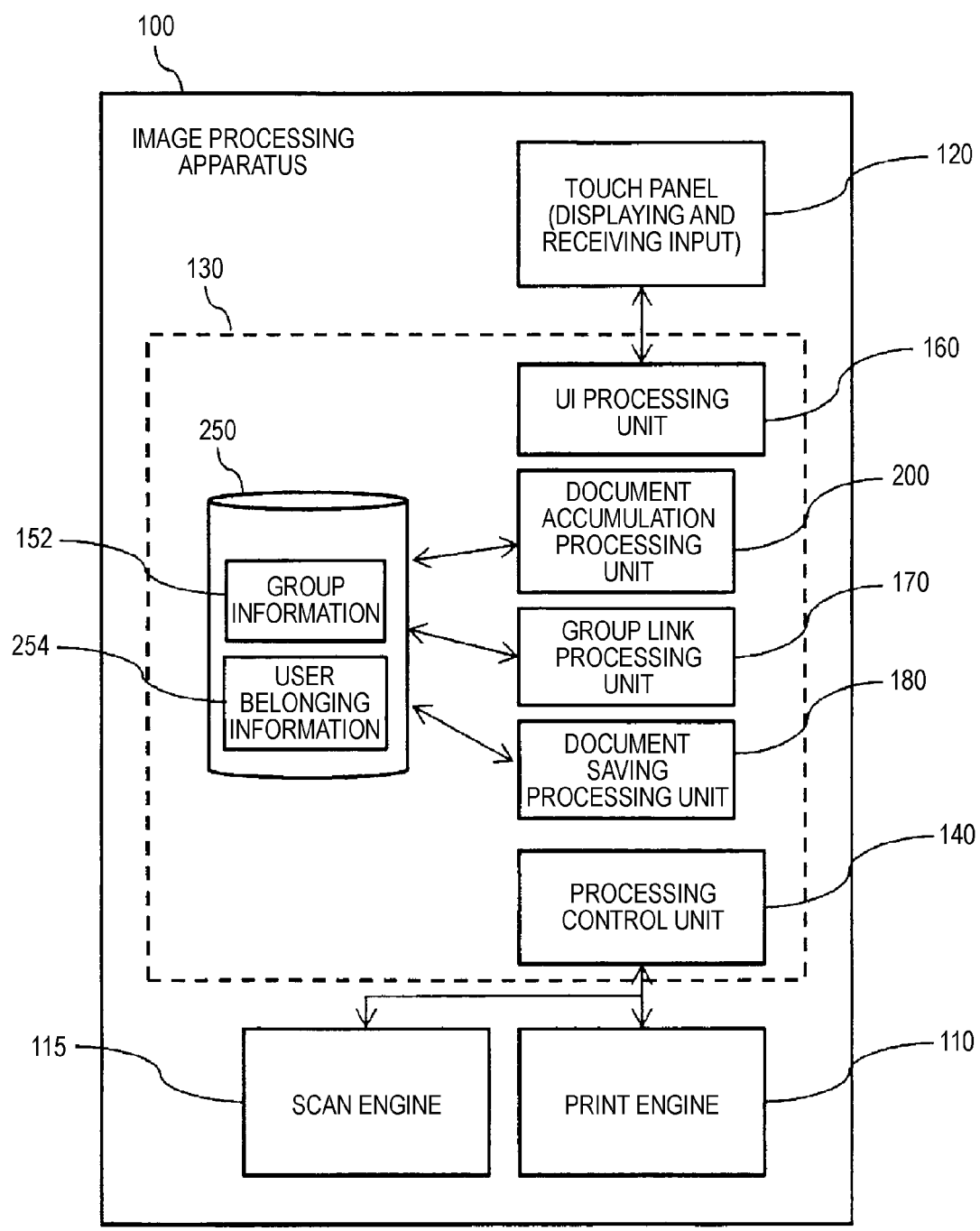
FIG. 9 is a diagram illustrating an example of a functional configuration of an individual image processing apparatus.

In addition, in the example in FIG. 5, the document rearrangement unit 190 achieves uniformity in the group by transferring the documents of the host apparatus to the linked apparatus. However, as another example, the document rearrangement unit 190 may instruct the linked apparatus to transfer the documents to another apparatus in the group for uniformity. In FIG. 8, an example of a processing procedure of the document rearrangement unit 190 in the case described above is illustrated.

In the procedure in FIG. 8, the document rearrangement unit 190 determines whether or not an event (for example, accumulation of the documents) occurs, which can be a trigger for the rearrangement of the documents (S100A), and in a case where the triggering event occurs, performs the processing tasks S102 to S116 similar to the procedure in FIG. 5. However, in the procedures in S112 to S116 in FIG. 5, only the transfer pattern of transferring the documents in the host apparatus to the linked apparatuses is discussed. However, in the procedure in FIG. 8, the entire transfer patterns of transferring the documents among the entirety of image processing apparatuses 100 in the group that can currently be communicated with each other are subject to be discussed. Then, in S118A, the document rearrangement unit 190 transfers the documents in the host apparatus to the linked apparatuses according to the transfer pattern acquired in S112 through S116, and instructs each linked apparatus to transfer the documents in each linked apparatus to the transfer destination indicated by the transfer pattern.

In addition, in the example described above, the document rearrangement units 190 of all the image processing apparatuses 100 in the group are in an effective state (that is, perform the rearrangement of the documents described above), however, that is also nothing but an example. As another example, only one or a few document rearrangement units 190 of the image processing apparatuses 100 in the group may be in an effective state. In this case, when the image processing apparatus 100 of which the document rearrangement unit 190 is in the effective state is in the inaccessible state, it is assumed that there may be a problem in that the rearrangement of the documents in the group cannot be performed. Therefore, in order to avoid such a problem, when the image processing apparatus 100 of which the document rearrangement unit 190 is in the effective state is shifted to the inaccessible state, a linked apparatus which can be communicated with and of which the document rearrangement unit 190 is not in the effective state is searched for, and the found linked apparatus is requested to make the document rearrangement unit 190 be in the effective state. When a response saying that the document rearrangement unit 190 is in the effective state is received from the requested linked apparatus, the requesting image processing apparatus 100 shifts to the inaccessible state.

Second Embodiment

Next, a second embodiment will be described. Descriptions on configurations similar to that in the first embodiment will appropriately be omitted.

The information processing unit 130 is a mechanism for executing various information processing tasks for controlling of the image processing apparatus 100. The information processing unit 130 includes a processing control unit 140, a setting storage unit 250, a UI processing unit 160, a document accumulation processing unit 200, a group link processing unit 170, and a document saving processing unit 180.

The setting storage unit 250 stores various setting information items used for controlling of the image processing apparatus 100. Particularly, in the present embodiment, the setting storage unit 250 stores group information 152 and user belonging information 254. Content of the group information 152 and the user belonging information 254 will be described below with reference to FIG. 10 and FIG. 11.

Being different from the first embodiment, instead of the processing control unit 140, the document accumulation processing unit 200 performs processing of accumulating documents input from the user into the storage device (not illustrated) in the image processing apparatus 100. The document accumulation processing unit 200 stores, for example, document data scanned by the scan engine 115 into the storage device in association with the identification information of the user (referred to as "user ID") who instructs the scanning. In addition, according to the accumulation request sent to the image processing apparatus 100 from a user operating another apparatus on the network group 200 such as a personal computer, the document accumulation processing unit 200 stores the requested document (for example, document data described in a page description language or the like) in the storage device in association with the user ID of the user. The user ID may be acquired by the image processing apparatus 100 performing the user authentication when, for example, the user tries to locally operate the image processing apparatus 100 or when another apparatus such as a PC sent the accumulation request to the image processing apparatus 100.

Next, the group information 152 stored in the setting storage unit 250 of the image processing apparatus 100 will be described with reference to FIG. 10. With regard to each group to which the image processing apparatuses 100 belong, the group information 152 includes identification information of the image processing apparatus 100 ("apparatus ID") and identification information of the group to which each of the image processing apparatuses 100 belongs (referred to as "group ID"). In the illustrated example, IP address of each image processing apparatus 100 on the network 200 is used as the apparatus ID. An apparatus ID "localhost" indicates the host apparatus. In addition, in the illustrated example, the image processing apparatus 100 belongs to the groups "01", "02", "04", and "10". One image processing apparatus 100 other than the host apparatus is registered in the group "01", "04", and "10 respectively. Two image processing apparatuses 100 other than the host apparatus are registered in the group "02".

Next, the user belonging information 254 stored in the setting storage unit 250 will be described with reference to FIG. 11. The group IDs to which the users belong are registered in the user belonging information 254 in association with the user IDs of each user. That is, in the present embodiment, the users are associated with the groups of the image processing apparatus 100. The user can accumulate a document in the image processing apparatus 100 in the group to which the user belongs, and can print out the accumulated document from any of the image processing apparatuses 100 in the group. Conversely, the user cannot accumulate a document in the image processing apparatuses 100 in the group to which him/herself does not belong.

The group of the image processing apparatuses 100 is configured in a unit of each office, each floor, or each department of a company that uses the image processing apparatuses 100. In this case, the user belongs to a group configured from the image processing apparatuses 100 in the office, the floor, or the department to which him/herself belongs. A plurality of image processing apparatuses 100 installed in a facility which are commonly used by many offices or departments such as a conference room is set to belong to a plurality of groups, and thus, the users who belong to the plurality of offices or department can use the image processing apparatuses 100. This example is just an example of description for an easy understanding. The group of the image processing apparatus 100 can freely be configured.

The group information 152 and the user belonging information 254 are set by a manager who manages the groups of the image processing apparatuses 100 in such manner that there is no conflict between the image processing apparatuses 100.

The user belonging information 254 in the illustrated example is individually registered for each image processing apparatus 100. Therefore, the system can be configured in such a manner that, for example, a user A can be registered as a member of group 1 in the group of the image processing apparatuses 100 which belongs group 1 and also can be registered as a member of group 2 in the group of the image processing apparatuses 100 which belongs group 2.

Figure 12:
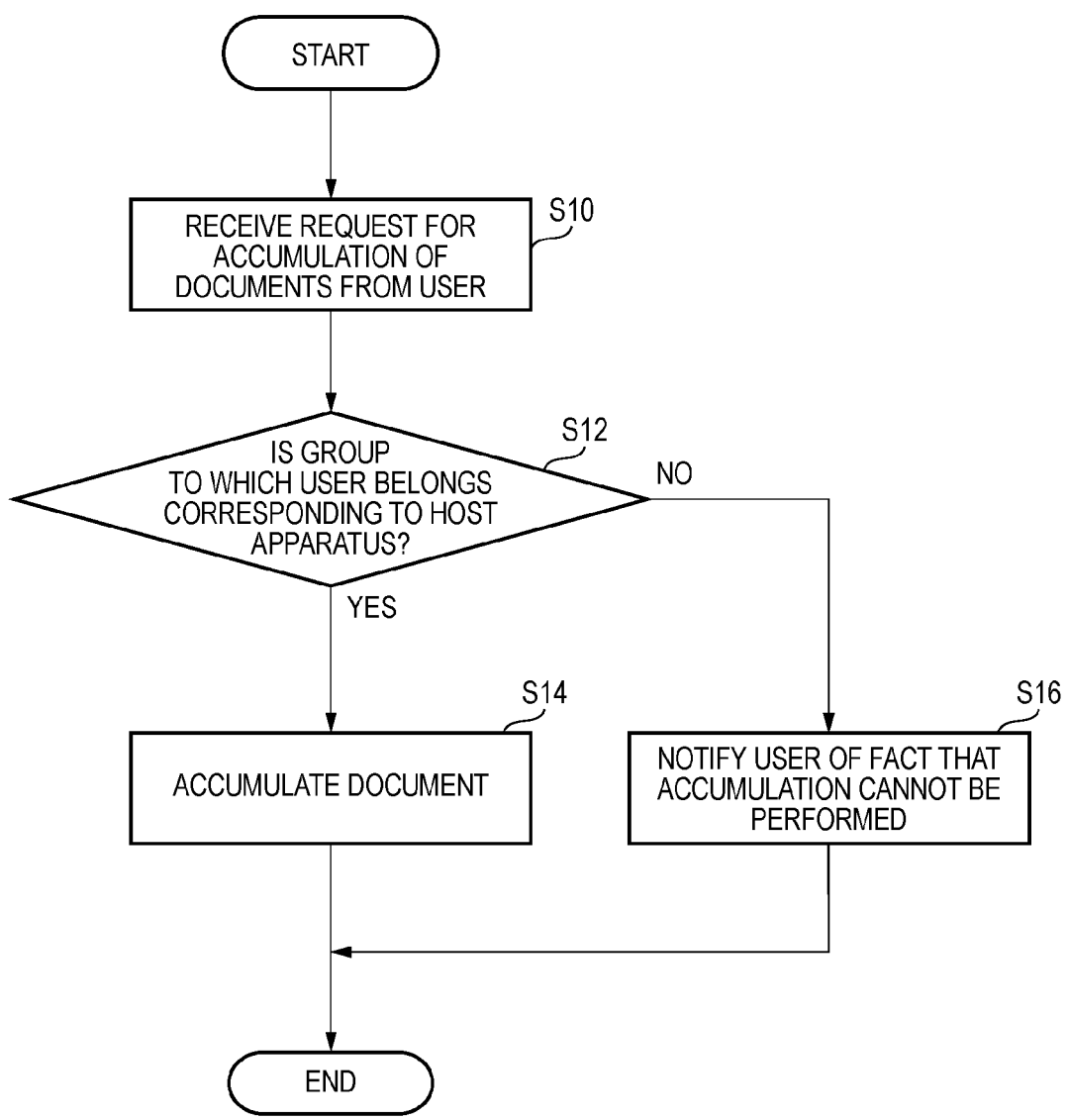
FIG. 12 is a diagram illustrating an example of a processing order in a document accumulation processing unit.

Next, an example of processing procedure of the document accumulation processing unit 200 will be described with reference to FIG. 12. In this example, the document accumulation processing unit 200 receives a request for the accumulation of documents from the user operating the touch panel 120 or the user operating the PC on the network 200 (S10). This request is accompanied by the user ID of the user. The document accumulation processing unit 200 specifies the group ID of the group to which the user ID accompanying the accumulation request belongs by referring to the user belonging information 254. Then, the document accumulation processing unit 200 determines whether or not the specified group ID is corresponding to the host apparatus (S12). That is, in S12, it is determined whether or not the group to which the user who requested the accumulation belongs is corresponding to any of the groups to which the host apparatus belongs. As an example, in this determination, it may be determined whether or not the group ID of the group to which the user who requested the accumulation belongs is included in the group information 152 illustrated in FIG. 10. In the example in FIG. 10, since the group ID of each group to which the host apparatus belongs is listed and the group ID of the group to which the apparatus does not belong is not included in the group information 152, the above-described determination is sufficient. However, in a case where group information is used as the group information 152, which includes the information of the group to which the host apparatus does not belong such as group information in which the groups of all the image processing apparatuses 100 in the company are registered, in S12, it is necessary to determine whether or not the group ID of the group to which the user belongs is coincident with any of the group IDs of the group to which the host apparatus belongs.

In a case where the determination result in S12 is YES, that is, in a case where the group to which the user who requested the accumulation belongs is corresponding to any of the groups to which the image processing apparatus 100 belongs, the document accumulation processing unit 200 accumulates the document data sent with the request into the storage device (S14). Here, the user ID of the user is in association with the accumulated document. On the other hand, in a case where the determination result in S12 is NO, the document accumulation processing unit 200 sent an error message indicating that the document cannot be accumulated in the image processing apparatus 100 because the groups are not correspondence to each other to the user who requested the accumulation (S16). Then, the processing of requesting the accumulation of the document ends.

Next, the processing procedure of the document saving processing unit 180 will be described with reference to FIG. 13. The procedure is executed when the image processing apparatus 100 starts the shutdown.

In this procedure, the document saving processing unit 180 performs the processing tasks in S20 to S32 for each document called out from the operating system of the image processing apparatus 100 which receives a shutdown instruction and accumulated in the storage device of the host apparatus. That is, in the processing for each document, firstly, the user ID accumulated in association with the document is acquired (S20), and the group ID corresponding to the user ID is detected from the user belonging information 254 (S22). Then, if the group ID corresponding to the user ID is detected in S22 (the determination result in S24 is YES), next, the apparatus ID of each image processing apparatus 100 which belongs to the detected group ID is obtained from the group information 152. Then, the processing tasks in S26 to S30 are performed in the order for each of the obtained apparatus IDs.

That is, the document saving processing unit 180 determines whether or not there is an apparatus which is has not been investigated yet in the image processing apparatuses 100 corresponding to the detected group ID (S26), and if the determination result is YES, an access to one of the image processing apparatuses 100 is attempted via the network 200 (S28). Then, it is determined whether or not the access can be performed (S30), and in a case where the determination result is YES, the document saves in the image processing apparatus 100 (S32). The saving of the document is performed, for example, by moving the file itself of the document to the accessed image processing apparatus 100. In this case, the document is removed from the image processing apparatus 100 in transition to an inaccessible state. In addition, the saving of the document may be performed by copying the document into the accessed image processing apparatus 100. In a case where it is determined that the access cannot be performed in S30, the process returns to S26. In a case where the determination result is NO in S24 or S26, the processing for that document ends while the processing tasks in S28 to S32 are omitted.

When the processing tasks S20 to S32 with regard to all the documents accumulated in the image processing apparatus 100 are completed in this way, a completion notice is sent to the operating system of the image processing apparatus 100 from the document saving processing unit 180. According to the notice, the operating system executes the shutdown of the image processing apparatus 100 (S34).

Figure 13:
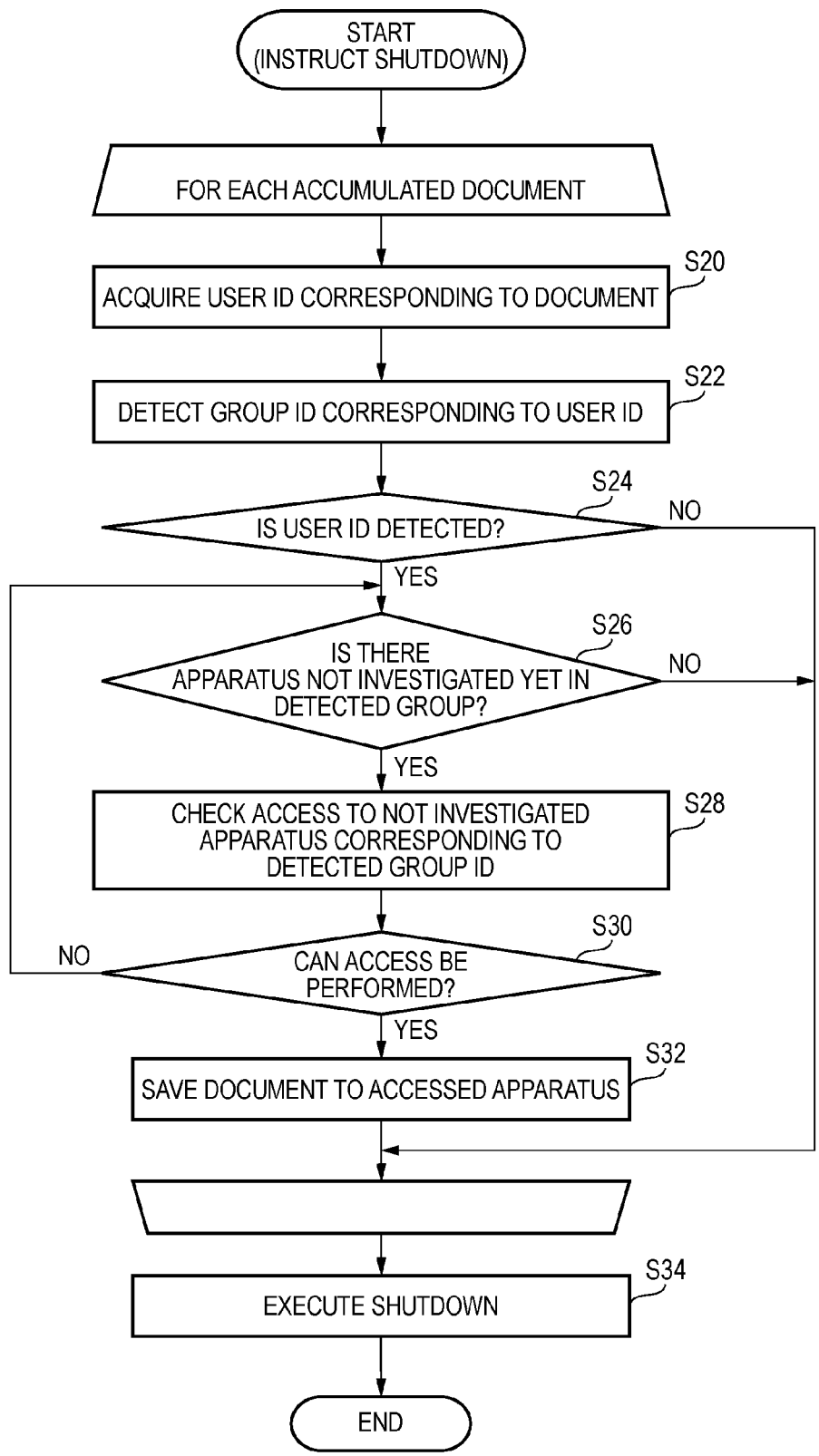
FIG. 13 is a diagram illustrating an example of a processing order in a document saving processing unit.

In FIG. 13, a case of shutdown is used as an example. However, besides the case of shutdown, in a case where the image processing apparatus 100 in inaccessible state, the saving processing in FIG. 13 is performed.

According to the present embodiment described above, in a case where the image processing apparatus 100 is in inaccessible state, the individual document accumulated in the image processing apparatus 100 saves to another active image processing apparatus 100 in the group corresponding to the user who accumulated the each of those documents. Therefore, even when the image processing apparatus 100 is in inaccessible state, the document accumulated in the image processing apparatus 100 is supplied to any of the image processing apparatus 100 in the same group from the image processing apparatus 100 of the saving destination.

The functions of the information processing unit 130 of the image processing apparatus 100 described above is realized by causing a computer to execute programs that represent the functions of each apparatus. Here, as hardware, the computer has a circuit configuration in which a microprocessor such as a CPU, memories such as a random access memory (RAM) and a read only memory (ROM) (first storage), a controller for controlling fixed storage device such as a hard disk drive (HDD) and a solid state drive (SSD), various I/O (input/output) interfaces, a network interface that performs a control for connecting to a network such the local area network, and the like are connected to each other via, for example, a bus. In addition, a disk drive for reading or writing with respect to a portable disk recording medium such as a CO or a DVD, a memory writer for reading or writing with respect to a portable non-volatile recording medium of various standards such as a flash memory, and the like may be connected to the bus via, for example, the I/O interface. A program in which the processing content of each module illustrated above is described is stored in a fixed storage device such as the HOD via the recording medium such as the CD or the DVD, or via the communication means such as the network, and then, installed in the computer. The program stored in the fixed storage device is read out to the RAM and is executed by a microprocessor such as the CPU, and then, the function module groups illustrated above are realized.

The present specification may be construed as disclosing the followings.

It is an image processing apparatus including:

a providing unit that provides a document data accumulated in a host apparatus according to a request from another apparatus in a same apparatus group to which the host apparatus belongs;

an accumulation control unit that accumulates a document data in the host apparatus in association with a user in a case where the user who instructs the accumulation of the document data corresponds to the apparatus group to which the host apparatus belongs, and controls not to accumulate the document data in a case where the user does not correspond to the apparatus group; and a saving unit that causes each document accumulated in the host apparatus to be saved in another active image processing apparatus in the apparatus group corresponding to the user in association with each document in response to the host apparatus transiting to an inaccessible state.

It is a non-transitory computer readable medium storing a program that causes a computer to function as:

a providing unit that provides a document data accumulated in a host apparatus according to a request from another apparatus in a same apparatus group to which the host apparatus belongs;

an accumulation control unit that accumulates a document data in the host apparatus in association with a user in a case where the user who instructs the accumulation of the document data corresponds to the apparatus group to which the host apparatus belongs, and controls not to accumulate the document data in a case where the user does not correspond to the apparatus group; and a saving unit that causes each document accumulated in the host apparatus to be saved in another active image processing apparatus in the apparatus group corresponding to the user in association with each document in response to the host apparatus transiting to an inaccessible state.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
at least one hardware processor configured to implement:
a providing unit configured to provide a document data accumulated in a host apparatus according to a request from another apparatus in a same apparatus group to which the host apparatus belongs; and a control unit configured to acquire sizes of document groups currently stored in each of other image processing apparatuses from each of those image processing apparatuses in the apparatus group, to determine a difference between the sizes of the document groups, and to perform a move, in response to determining that the difference between the sizes is greater than a predetermined threshold, of moving a document among the host apparatus and those image processing apparatuses in such a manner that the move changes the sizes of the document groups accumulated in the host apparatus and each of those image processing apparatuses to approach a uniform size, wherein a first difference between a first number of all documents configured to be deleted by ones of the image processing apparatus and the other image processing apparatus after a first predetermined amount of time from a current time is greater before the move than after the move, a second difference between a second number of all documents configured to be deleted by ones of the image processing apparatus and the other image processing apparatus after a second predetermined amount of time from the current time is greater before the move than after the move, and the second predetermined amount of time is greater than the first predetermined amount of time.

2. The image processing apparatus according to claim 1, wherein the control unit is further configured to acquire information of a remaining storage period of each document accumulated in each of other image processing apparatuses from each of those image processing apparatuses in the apparatus group, and to perform control of moving the document among the host apparatus and those image processing apparatuses in such a manner that a condition is further satisfied, in which a distribution of the remaining storage period of the accumulated document group approaches a uniform distribution among the host apparatus and those image processing apparatuses.

3. The image processing apparatus according to claim 1, wherein the control unit is further configured to acquire information of a user who instructs the accumulation of each document accumulated in each of those image processing apparatuses from each of other image processing apparatuses in the apparatus group, and to perform control of moving the document among the host apparatus and those image processing apparatuses in such a manner that a condition is further satisfied, in which a distribution of the user who instructs the accumulation of the document group to be accumulated approaches uniform among the host apparatus and those image processing apparatuses.

4. The image processing apparatus according to claim 1, wherein the control unit is further configured to delete first documents of the document groups after a first amount of time, the control unit is further configured to delete second documents of the document groups after a second amount of time different from the first amount, and the control unit is further configured to perform the move such that, in addition to the sizes approaching the uniform size, both the first documents and the second documents are uniformly distributed among the image processing apparatuses.

5. The image processing apparatus according to claim 4, wherein the first documents of the document groups are associated with a first user, the second documents of the document groups are associated with a second user different from the first user.

6. The image processing apparatus according to claim 1, wherein the difference between the sizes of the document groups stored by ones of the image processing apparatus and the other image processing apparatus is greater before the move than after the move.

7. The image processing apparatus according to claim 1, wherein a first difference between a first number of all documents registered to a first user and stored by ones of the image processing apparatus and the other image processing apparatus is greater before the move than after the move, and a second difference between a second number of all documents registered to a second user and stored by ones of the image processing apparatus and the other image processing apparatus is greater before the move than after the move.

8. A non-transitory computer readable medium storing a program that causes a computer to:

provide a document data accumulated in a host apparatus according to a request from another apparatus in a same apparatus group to which the host apparatus belongs; and acquire sizes of document groups currently stored in each of other image processing apparatuses from each of those image processing apparatuses in the apparatus group, determine a difference between the sizes of the document groups, and perform a move, in response to determining that the difference between the sizes is greater than a predetermined threshold, of moving a document among the host apparatus and those image processing apparatuses in such a manner that the move changes the sizes of the document groups accumulated in the host apparatus and each of those image processing apparatuses to approach a uniform size, wherein a first difference between a first number of all documents configured to be deleted by ones of the image processing apparatus and the other image processing apparatus after a first predetermined amount of time from a current time is greater before the move than after the move, a second difference between a second number of all documents configured to be deleted by ones of the image processing apparatus and the other image processing apparatus after a second predetermined amount of time from the current time is greater before the move than after the move, and the second predetermined amount of time is greater than the first predetermined amount of time.

* * * * *